United States Patent [19]
Bachmann et al.

[11] 3,971,645
[45] July 27, 1976

[54] METHOD OF MAKING COMPOUND-GLASS OPTICAL WAVEGUIDES FABRICATED BY A METAL EVAPORATION TECHNIQUE

[75] Inventors: Klaus Jürgen Bachmann, Piscataway; Suzanne Rose Nagel, North Plainfield; Arthur David Pearson, Bernardsville; Paul Herman Schmidt, Chatham; Arthur Richard Tynes, Red Bank, all of N.J.

[73] Assignee: Bell Telephone Laboratories, Incorporated, Murray Hill, N.J.

[22] Filed: Sept. 12, 1975

[21] Appl. No.: 612,762

[52] U.S. Cl. .................................... 65/3 A; 65/13; 65/60 C; 65/DIG. 7; 427/167
[51] Int. Cl.² .................... C03C 17/08; G02B 5/14
[58] Field of Search .............. 65/3 A, 30 R, DIG. 7, 65/60 C, 13; 427/167

[56] References Cited
UNITED STATES PATENTS

| | | | |
|---|---|---|---|
| 3,659,915 | 5/1972 | Maurer | 65/30 R X |
| 3,711,262 | 1/1973 | Keck et al. | 65/3 A |
| 3,806,224 | 4/1974 | MacChesney | 65/3 A X |
| 3,900,305 | 8/1975 | DeLuca | 65/30 R |

FOREIGN PATENTS OR APPLICATIONS

| | | | |
|---|---|---|---|
| 1,340,849 | 12/1973 | United Kingdom | 65/3 A |

*Primary Examiner*—Robert L. Lindsay, Jr.
*Attorney, Agent, or Firm*—P. V. D. Wilde

[57] ABSTRACT

Glass fiber optical-waveguides consisting of a metal oxide-silicate glass core and silica cladding are produced according to the invention by means of a metal evaporation technique. An evacuated fused silica tube containing an evaporated metal deposit is heated to temperatures sufficient to form a uniform metal silicide layer on its inner surface. This layer is then oxidized and reacted with the silica tubing at elevated temperatures to form a metal oxide-silica glass layer. The tube is then collapsed to give a solid rod preform with a metal oxide-silica glass core. Fibers drawn from such preforms exhibit a graded refractive index profile and low loss. The details of the fabrication technique are described, and a representative loss spectrum is presented.

7 Claims, 2 Drawing Figures

METHOD OF MAKING COMPOUND-GLASS OPTICAL WAVEGUIDES FABRICATED BY A METAL EVAPORATION TECHNIQUE

BACKGROUND OF THE INVENTION

The discovery of the laser in 1960 spurred promises of transmitting information over beams of light. But it was soon evident that a practical waveguide medium for transmitting light signals over significant distances did not exist. However, the recent development of optical fibers through which optical information can be transmitted with remarkably low loss has made optical communication appear viable.

Optical fibers for transmitting light signals have been proposed in many forms. An especially promising fiber is the so-called "clad fiber". This fiber relies on total internal reflection at the interface between a fiber core and a surrounding cladding to contain the light within the core of the fiber. The core is made of a highly pure glass material in which light absorption and scattering losses are minimal. The cladding material has an index of refraction that is less than that of the core.

From a material standpoint, many optical fiber structures rely on some form of fused silica. Silica is a chemically stable, simple material and can be made in extremely pure form. Since the mechanism which causes absorption losses in very low loss fibers involves chemical impurities (particularly transition metal ions and water) the purity of the material is important.

Fused silica has one of the lowest indices of refraction of all glasses and therefore it cannot easily serve as the core in a clad glass fiber. An alternative is to modify highly pure silica chemically to increase its refractive index enough that the modified material becomes the core material and the fused silica the cladding material. This is one of the "clad fiber" structures that has gathered attention and favor.

Clad fiber structures are conventionally made by chemical deposition processes. For a description of exemplary techniques see U.S. Pat. No. 3,659,915 issued to R. D. Maurer and P. C. Schultz; U.S. Pat. No. 3,711,262 issued to D. B. Keck and P. C. Schultz; *Applied Physics Letters*, 23 (6) 338–339 (1973) by W. G. French, A. D. Pearson, G. William Tasker and J. B. MacChesney entitled "Low Loss Fused Silica Optical Waveguide with Borosilicate Cladding"; and *Applied Physics Letters*, 23 (6) 340–341 (1973) by J. B. MacChesney, R. E. Jaeger, D. A. Pinnow, F. W. Ostermayer, T. C. Rich and L. G. Van Uitert entitled "Low Loss Silica Core-Borosilicate Clad Fiber Optical Waveguide."

In the well-known modified chemical vapor deposition (MCVD) process for forming optical waveguides, volatile metal halides (such as $SiCl_4$, $GeCl_4$, and $BCl_3$) are entrained in an $O_2$ stream which is passed through a rotating fused silica support tube. The tube is heated by a motor driven $H_2/O_2$ torch to temperature sufficient to initiate the MCVD reaction in the hot zone. This results in the deposition of a clear glassy layer. After the deposition of such layers is complete, the tube is further heated, causing it to collapse and form a solid rod preform. The refractive index profile of the preform can be controlled by varying the ratio of the various halides used. Fibers drawn from such preforms exhibit very low loss and their compositional (and thus refractive index) profiles can be tailored precisely.

STATEMENT OF THE INVENTION

According to this invention a graded index core, silica clad fiber structure is produced by a metal evaporating technique. It involves evaporating a volatile metal into a fused silica tube, and reacting the metal vapor in vacuum with the inner surface of the silica tube to first form a metal silicide layer. The metal silicide layer is then oxidized and simultaneously reacted with the wall of the silica tube producing a core layer having a mixed oxide composition. The core layer after oxidation has a larger thickness than the initial silicide layer due to diffusion of the metal or metal oxide into the silica wall. A feature of this technique is that all the silica in the final clad structure is derived from the original fused silica tubing and is therefore of highly controllable purity.

Forming the metal silicide layer by initial evaporation of selected metals has important advantages. Evaporation is a well-known purification process. The metals themselves are often commercially available in high purity form. As already indicated, in the spectral region of importance for optical waveguides, absorption losses are due mainly to trace amounts of the transition metal ions. The vapor pressure of the metal selected to be deposited can be much greater at a given temperature than the vapor pressure of any transition metal impurities in the metal. Therefore, the amount of transition elements transported during the evaporation process will be negligible. Table I shows a variey of metals which have relatively high vapor pressures at low temperatures compared to those of the transition metals.

TABLE I

Vapor Pressure Data for Various Elements

| Element | Temperature (°C) For 1 mm Pressure | Melting Point (°C) | Boiling Point (°C) |
|---------|------------------------------------|--------------------|--------------------|
| Cs | 279 | 28.5 | 678 |
| Rb | 297 | 38.5 | 688 |
| K  | 341 | 62.3 | 774 |
| Cd | 394 | 321  | 765 |
| Na | 439 | 97.5 | 883 |
| Zn | 487 | 419  | 907 |
| Mg | 621 | 651  | 1090 |
| Li | 723 solid | 186 | 1347 |
| Sr | 847 (5mm) | 800 | 1384 |
| Ca | 926 (5mm) | 839 | 1484 |
| Ba | 984 (5mm) | 725 | 1640 |
| Pb | 973 | 328  | 1740 |
| Mn | 1292 | 1260 | 1962 |
| Co | 1516 | 1495 | 2870 |
| Cr | 1616 | 1857 | 2672 |
| Cu | 1628 | 1083 | 2567 |
| Fe | 1787 | 1535 | 2750 |
| Ni | 1810 | 1452 | 2732 |
| V  | 1845 | 1890 | 3380 |

If any volatile transition metal compounds are present, further purification can be accomplished by evaporating the metal through a conventional hot baffle system. The baffles serve to decompose the volatile compound and trap the transition metal.

The silicide formation step is important also in that it binds the evaporated metal to the silica tube wall and facilitates the subsequent oxidation step. If the metal is simply evaporated onto the walls of the tube it may evaporate away or "ball up" during the attempted oxidation.

Of the metals listed in Table I, those listed from cesium to lithium (those listed above the line) are regarded as preferred for the process of the invention.

Cesium is advantageous not only because of the properties listed but also because it induces relatively large increases in refractive index for a given molar concentration in silica.

DETAILED DESCRIPTION

The invention will be described in detail with the aid of the drawing in which.

Potassium metal evaporation was chosen to demonstrate the invention. Potassium has a low evaporation temperature (see Table I), and is relatively easy to handle. In addition, compositions in the potassium oxide-silica system have been reported which have inherently low Rayliegh scattering, even lower than the best measured vitreous silica.

Fused silica tubing (14mm OD, 3.5mm bore, and 14mm OD,12mm bore) and ampoules containing 99.99+% pure potassium sealed under argon were used as raw material sources. The baffles were made from either molybdenum foil or fused silica rod.

Because the fused silica tubing is the source of silica for both the core and the cladding, it must be of high purity, clean, flawless and dust free. Cleaning was accomplished by etching in a solution of 5% HF, 45% $NHO_3$, 50% $H_2O$ (by volume) for 5 minutes, thoroughly rinsing with 18 megohm water, drying with filtered nitrogen and sealing in a clean room. Just prior to use, the tubing was flame polished with an $H_2/O_2$ torch while passing filtered, ultrapure oxygen through it. This serves to smooth out any flaws present on the inner surface of the tubing as well as remove any impurities not etched away in the cleaning process.

Figure 1:
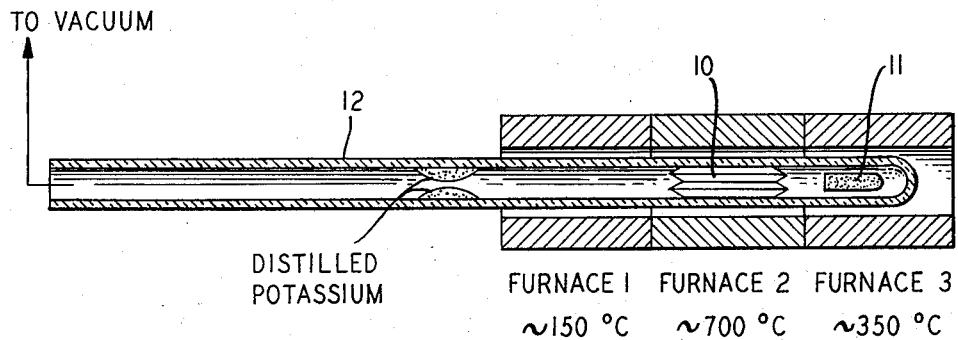
FIG. 1 is a schematic representation of the deposition apparatus used to make clad fiber preforms in accordance with the invention.

The evaporation apparatus is shown in FIG. 1. The baffles 10 and the ampoule 11 containing potassium were degreased with chloroform and then further cleansed by an acetone rinse, an 18 megohm water rinse, a 50% HCl, 50% $H_2O$ (by volume) soak for 15 min., a thorough water rinse, then air drying in a clean hood.

The fused silica tubing 12 was placed inside a clean hood (not shown) and one end was loaded with molybdenum or silica baffles. The potassium ampoule was scored with a diamond scribe, snapped open, and loaded into the tubing, open end first. This end of the tubing was then sealed off with an $H_2O_2$ torch, and the opposite end was then attached to a vacuum system and evacuated to $10^{-5}$ to $10^{-6}$ Torr. After evacuating, furnace 1 and 2 were moved into place, as shown in FIG. 1. Furnace 2, was maintained at 700°C, to preheat the baffles and ensure decomposition of any volatile transition metal compounds during the initial evaporation step. Furnace 1, heated to approximately 150°C, ensured that the potassium was deposited downstream from the baffles. After preheating furnace 3 to approximately 350°C, it was moved in place around the portion of silica tubing containing the potassium ampoule. The potassium was evaporated through the baffles and collected in the cool portion of the tubing. After evaporation, the portion of tubing containing the potassium deposit was sealed off under vacuum from both the baffles and the vacuum system by use of an $H_2/O_2$ torch.

This tube was then placed in a preheated isothermal furnace at 600°C. During this step, the potassium was vaporized and uniformly reacted with the inner silica surface to form a potassium silicide layer.

After cooling the tube to room temperature, the ends were snapped off in a clean hood. It was immediately mounted in a glass working lathe and flushed with ultrapure filtered oxygen. As the tube rotated in the lathe, it was heated to approximately 1600C by passing a motor driven $H_2/O_2$ torch along its length. During this pass, the potassium silicide layer was oxidized and simultaneously reacted with the inner silica wall to form a compound potassium oxide-silica glass layer. This first pass must be made at sufficiently high temperature to form a stable high-silica glass layer. When the temperature is too low, cracking due to a thermal expansion mismatch between the coating and the silica can occur, leading to the incorporation of bubbles during subsequent heating operations. Additionally, crystallization can occur which leads to inhomogeneities and bubbles.

Depending on the tube diameter and wall thickness, one or more collapsing passes with the $H_2/O_2$ torch were then made. The rotating tube was heated to approximately 1900°C. The $O_2$ flow was maintained until the final pass. During this pass, the tube collapsed completely to form a solid rod preform with a potassium oxide-silica glass core. This core has a graded refractive index profile due to the outward diffusion of potassium. The unreacted portion of the silica tube serves as the cladding. This preform can then be drawn into fiber using a conventional fiber drawing machine and any suitable heat source. Typically either $H_2/O_2$ flame heat or a carbon resistance furnace was used.

The loss spectra of the fibers made by such a technique were determined by launching light from a grating monochromator into the fiber using an 0.09 numerical aperture lens.

The technique described has been used to produce preforms and fibers of various dimensions and core-to-cladding ratios. This ratio can be varied by varying the bore size and wall thickness of the tubing used. Fibers up to 1100 meters long have been drawn, this limit being imposed by the size of the take-up drum of the fiber drawing machine. The largest core size has been 40μm (fiber O.D. = 125μm). Refractive index differences up to $\Delta n = 0.0085$ have been achieved using potassium as the dopant. Use of other alkalis, e.g., cesium or combinations of metals considerably increases the refractive index difference.

Figure 2:
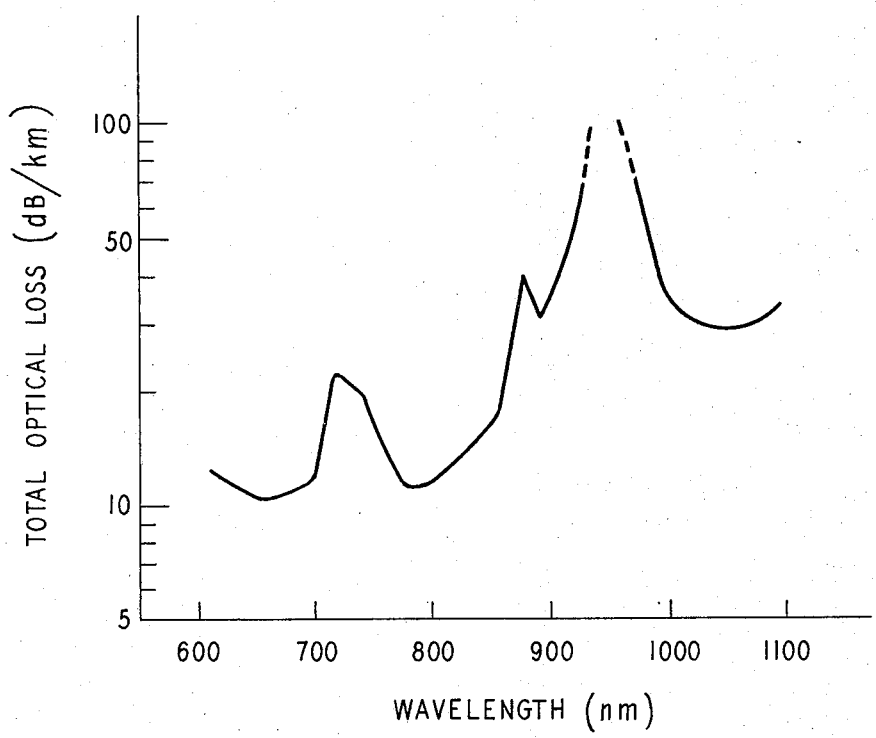
FIG. 2 is an optical loss spectrum from a typical clad fiber drawn from a preform prepared by the technique of the invention.

FIG. 2 shows a representative loss spectrum obtained for a fiber fabricated by this technique. The fiber had a $\Delta n = 0.0037$ and a lenght of 383m. The source of silica was Amersil Suprasil tubing. The loss minima were 10 dB/km at 0.65μm and 11 dB/km at approximately 0.8μm.

This same procedure has been used with cesium as the metal dopant, with qualitatively similar results. The index difference is somewhat larger with the cesium glass core. Procedurally, the technique can be applied very likely to all the alkali metals using the same processing conditions. The amount of metal placed into the silica tubing prior to silicide formation will partly determine the radius of the core. For the tubes used here, a range of 0.015 to 0.030 mg/mm² was used to produce fibers with conventionally sized cores. Extending this range by approximately an order of magnitude in order to define a preferred range it is recommended that the metal be evaporated and reacted in an amount in the range of 0.001 mg/mm² to 0.3 mg/mm² (with the area corresponding to the inside area of the tube). It is useful to reduce the pressure inside the tube during evaporation and initial reaction to avoid oxidation of the metal. We prefer to use a reduced pressure of at least $10^{-2}$ Torr. We have evidence that the silicides begin to form at temperatures of the order of 200°C which we recommend as a minimum operating temperature for the silicide forming step. We prefer to operate at higher temperatures, of the order of at least 400°C.

The oxidation and diffusion step begins to proceed adequately at approximately 1600°C, with acceptable diffusion of the metal species into the silica wall. Heating above 1850°C will collapse the silica tube and terminate further reaction. The results reported here were obtained with flowing oxygen. Mild oxygen pressures could be used as well.

Various additional modifications and extensions of this invention will become apparent to those skilled in the art. All such variations and deviations which basically rely on the teachings through which this invention has advanced the art are properly considered to be within the spirit and scope of this invention.

We claim:

1. A method for making a glass preform useful for drawing optical fibers comprising the steps of:

sealing into a high purity silica tube at reduced pressure a quantity of a metal selected from the group consisting of Cs, Rb, K, Cd, Na, Zn, Mg, and Li, heating the tube to react the metal with the interior wall of the tube to form a metal silicide coating on the interior wall, heating the tube in the presence of oxygen at a temperature above approximately 1600°C to form a mixture of metal oxide and silica and to simultaneously diffuse the metal significantly into the interior wall of the silica tube, and heating the tube to collapse the tube thus forming a glass preform with a glass core comprising the metal oxide.

2. The method of claim 1 in which the metal is an alkali metal.

3. The method of claim 1 in which the metal is potassium.

4. The method of claim 1 in which the metal is cesium.

5. The method of claim 1 in which the reduced pressure is at least $10^{-2}$ Torr.

6. The method of claim 1 in which the tube is heated to a temperature of at least 400°C to form the metal silicide coating.

7. The method of claim 1 in which the quantity of metal is in the range of 0.001 to 0.3 mg/square mm of the inside wall of the tube.

* * * * *